United States Patent [19]

Chuang et al.

[11] 4,374,116
[45] Feb. 15, 1983

[54] METHOD OF COMBINING GASEOUS HYDROGEN AND OXYGEN AND APPARATUS THEREFOR

[75] Inventors: Karl T. Chuang, Deep River; Maurice F. Roett, Calgary, both of Canada

[73] Assignee: Atomic Energy of Canada Limited, Ottawa, Canada

[21] Appl. No.: 271,961

[22] Filed: Jun. 9, 1981

[30] Foreign Application Priority Data

Nov. 3, 1980 [CA] Canada ................................. 363863

[51] Int. Cl.³ ............................................. C01B 5/00
[52] U.S. Cl. ................................... 423/580; 422/194; 422/235
[58] Field of Search ................ 423/580; 422/191, 194, 422/211, 235

[56] References Cited

U.S. PATENT DOCUMENTS

4,171,350 10/1979 Sanders ............................... 423/580

FOREIGN PATENT DOCUMENTS

| 467626 | 8/1950 | Canada ................................ 423/580 |
| 2852019 | 6/1979 | Fed. Rep. of Germany ...... 423/580 |
| 50-28398 | 9/1975 | Japan .................................. 423/580 |
| 55-126502 | 9/1980 | Japan .................................. 423/580 |
| 858079 | 1/1961 | United Kingdom ............... 423/580 |

Primary Examiner—O. R. Veritz
Assistant Examiner—Wayne A. Langel
Attorney, Agent, or Firm—Francis W. Lemon

[57] ABSTRACT

Gaseous hydrogen and oxygen are combined in an upwardly extending casing containing a catalytic assembly in an intermediate portion of the casing with means for distributing hydrogen gas in the catalytic assembly, distributing cooling water and oxygen feeds downwardly from a top portion of the casing on to the catalytic assembly and draining water from a bottom portion of the casing is recirculated. Combined oxygen and hydrogen entrained in the draining water are extracted by tapping water from the recirculating draining water. The catalyst assembly comprises high surface area, porous supports with platinum in the pores and a polytetrafluoroethylene coating over the supports, the platinum particles comprising about 0.1 to about 0.5 weight % of the total weight of the supports, platinum and polytetrafluoroethylene, and the polytetrafluoroethylene comprises about 2 to about 4 weight % of the total weight of support, platinum and polytetrafluoroethylene. Preferably the catalyst assembly has hydrophilic packing interspersed with the porous supports.

4 Claims, 1 Drawing Figure

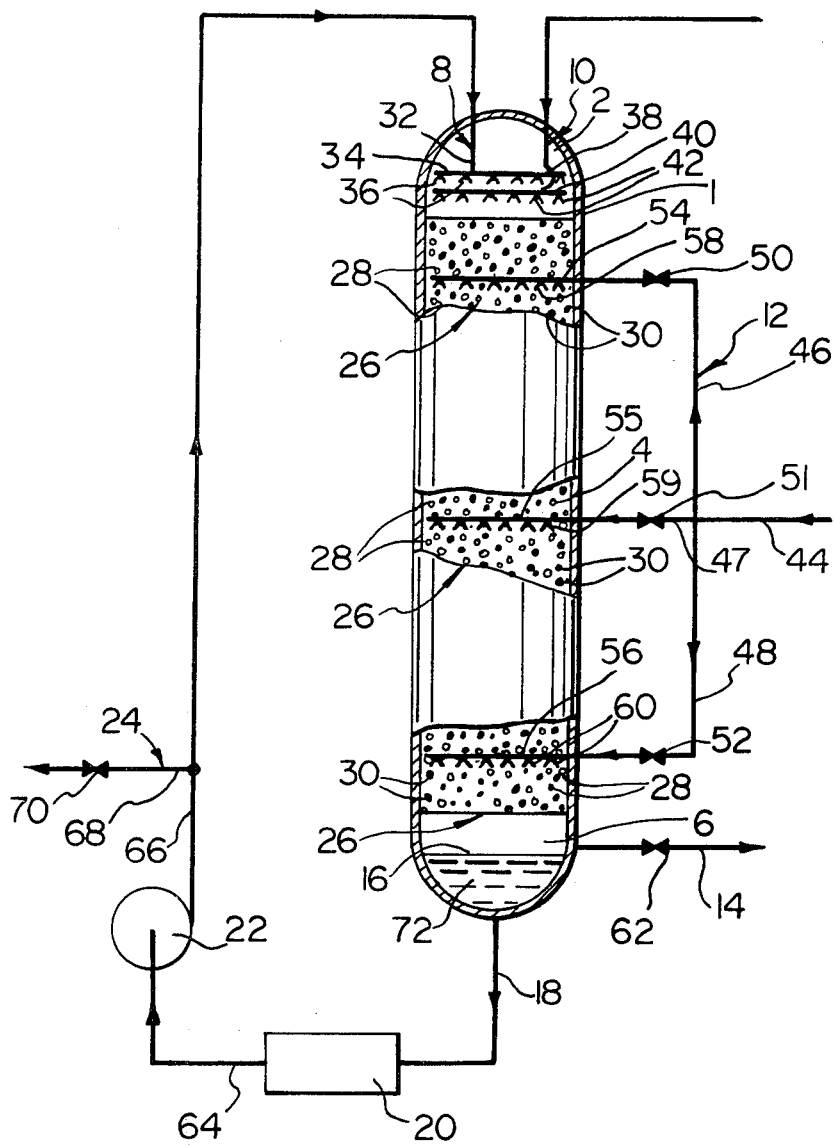

METHOD OF COMBINING GASEOUS HYDROGEN AND OXYGEN AND APPARATUS THEREFOR

This invention relates to a method of combining gaseous hydrogen and oxygen.

It has already been proposed in U.S. Pat. No. 4,098,964, dated July 4, 1978, "Storage Battery with Recombination Catalyst", H. Reber, to provide storage battery containing a recombination catalyst wherein the recombined water vapour from the catalyst is conducted by a conduit into the liquid electrolyte of the battery and is condensed therein. The recombination catalyst, which may be aluminum oxide or aluminum silicate coated with a thin layer of platinum and rendered hydrophobic by an outer coating comprising a thin porous layer of polytetrafluoroethylene, is in an upper enclosure through which the evolved gases pass and combine as steam before being directed back into the electrolyte.

While the proposal by Reber is useful, there is still a problem in that the quantity of water lost, by the catalyst failing to recombine the gaseous hydrogen and oxygen is undesirably great. One reason for the undesirably low activity of the catalyst in the Reber process is due to the fact that the catalyst used not only has a poor initial activity but rapidly loses its activity in contact with liquid water even with an outer coating of a thin porous layer of polytetrafluoroethylene. Because of the high loss of activity of the catalyst when in contact with liquid water, the Reber process must, after the catalyst has become warm, see column 2, line 63 to column 3, line 4, operate at a sufficiently high temperature to utilize the heat generated by recombining the hydrogen and oxygen to ensure that the water vapour thus produced with not condense above, and drop on to, the catalyst as liquid water. This is why with the Reber device it is essential for the recombined hydrogen and oxygen to be condensed in a condensing area by contact with the electrolyte.

There is a need for a gaseous hydrogen and oxygen combining apparatus wherein:

(i) the catalyst has an acceptable initial activity, (ii) contact of the catalyst with liquid water from the combined hydrogen and oxygen will not cause the catalyst to rapidly lose its activity so that relatively large quantities of hydrogen and oxygen can be combined, and the useful life of the catalyst is extended.

(iii) water vapour from the combined hydrogen and oxygen may be condensed at the catalyst by the cooling water, and allowed to drain downwardly as liquid water over the catalyst so that heat evolved in combining the gaseous hydrogen and oxygen is conducted away from the catalyst by the cooling water thus retarding thermal degradation of the catalyst.

In U.S. Pat. No. 3,888,974, dated June 30, 1975, "Process for Hydrogen Isotope Exchange and Concentration Between Liquid Water and Hydrogen Gas and Catalyst Assembly Therefor", William H. Stevens, there is described a bithermal hydrogen isotope exchange process wherein in one embodiment liquid water trickles through a catalyst bed through which hydrogen gas is rising. The catalyst bed may comprise a highly porous, solid support with catalytically active metal such as platinum, deposited on the surface of the pore walls thereof, and a substantially water repellant coating of, for example, polytetrafluoroethylene deposited on the support, and within and upon pore surfaces of the support, the coating rendering the catalyst body substantially impermeable to liquid water, but permeable to water vapour and hydrogen gas.

The catalyst bed in the William H. Stevens patent provides a hydrophobic, hydrogen gas and water vapour receptive catalyst which gives a rapid overall isotopic exchange between the gaseous hydrogen and hydrogen of a vapour phase of the liquid water, and a reduction in the loss of activity by contact with the liquid water.

It has now been found, according to the present invention that selected catalysts of the type disclosed in the William H. Stevens patent are remarkably good catalysts for use in gaseous hydrogen and oxygen combining apparatus because, in contrast to previously known devices, the same device can also use cooling water to condense water vapour formed by combining the gaseous hydrogen and oxygen and as a catalyst coolant without the catalyst losing activity by contact with liquid water. This provides an advantage in that the temperature at which recombination is carried out can be held at a much lower level (below 100° C.) than was previously possible (in the region of 350° C. to 400° C.), thus retarding thermal degradation of the catalyst, allowing the use of catalysts which exhibit a significant reduction in the loss of activity by contact with liquid water and substantially reducing the risk of hot spots occuring in the catalyst which can cause an explosion by igniting the hydrogen.

According to the present invention there is provided a method of combining gaseous hydrogen and oxygen comprising:

(a) distributing a flow of gaseous hydrogen in a catalytic assembly located in and substantially filling an intermediate portion of an upwardly extending casing, (b) distributing a flow of cooling water from a cooling water inlet to the casing, water downwardly into the catalytic assembly from an upper portion of the casing, (c) distributing gaseous oxygen in the upper portion of the casing, (d) circulating draining water from a lower portion of the casing to the cooling water inlet, and (e) removing a portion of the water from circulation, and wherein (f) the catalyst assembly comprises at least one high surface area, inert, porous support with platinum particles embedded in the pores, and beneath the exterior thereof, and a polytetrafluoroethylene coating thereon over the platinum particles comprising about 0.1 to about 0.5 weight % of the total weight of support, platinum and polytetrafluoroethylene present in the catalyst assembly, and the polytetrafluoroethylene comprising about 2 to the order of 4 weight % of the total weight of support, platinum and polytetrafluoroethylene present in the catalyst assembly, so that:

(g) the catalyst does not rapidly lose its activity by contact with the cooling water and has a good conversion efficiency.

Preferably the platinum particles comprise about 0.2 weight % of the total weight of support, platinum and polytetrafluoroethylene present in the catalyst assembly.

Preferably the polytetrafluoroethylene comprises about 2.5 to about 3.5 weight % of the total weight of support, platinum and polytetrafluoroethylene present in the catalyst assembly.

Best results have been obtained when the polytetrafluoroethylene comprises about 3 weight % of the total weight of support, platinum and polytetrafluoroethylene present in the catalyst assembly.

In some embodiments of the present invention the catalyst assembly includes at least one packing structure interspersed with the said at least one high surface area, inert, porous support, said at least one packing structure having an exterior which is substantially hydrophilic and relatively non catalytically active with regard to gaseous hydrogen and oxygen combining, and said at least one packing structure comprising 25 to 75% of the surface area of the catalyst assembly.

In the accompanying drawing, which illustrates, by way of example, an embodiment of the present invention, there is shown a diagrammatic view, with parts cut away, of a gaseous hydrogen and oxygen combining apparatus that is particularly useful, for example, for combining gaseous oxygen with gaseous hydrogen enriched with hydrogen isotopes.

In the accompanying drawing there is shown a gaseous hydrogen and oxygen combining apparatus, comprising:

(a) an upwardly extending casing 1 having an upper cooling water and gaseous oxygen receiving section 2, an intermediate catalyst bed section 4, a lower, liquid water collecting section 6, cooling water inlet means, generally designated 8, for distributing cooling water in the upper section 2, gaseous oxygen inlet means, generally designated 10, for distributing gaseous oxygen in the upper section 2, hydrogen gas inlet means, generally designated 12, to the intermediate section 4 for distributing gaseous hydrogen therein, a gas vent 14 above a water level 16 in the lower section and water outlet means 18 from the lower section 6, (b) water cooling means 20 connected to receive water from the water outlet means 18 of the casing 1, (c) water circulating means 22 connected to circulate water from the water cooling means 20 to the cooling water inlet means 8 of the casing 1, (d) means, generally designated 24, for removing a portion of the water from circulation, and (e) a catalyst assembly, generally designated as 26 substantially filling the intermediate catalyst bed section 4, the catalyst assembly generally designated 26 comprising at least one high surface area, inert, porous support, such as support 28, with platinum particles embedded in the pores, and beneath the exterior thereof, and a polytetrafluoroethylene coating thereon over the platinum particles, the platinum particles comprising about 0.1 to about 0.5 weight % of the total weight of support 28, platinum and polytetrafluoroethylene present in the catalyst assembly, and the polytetrafluoroethylene comprising about 2 to about 4 weight % of the total weight of support, platinum and polytetrafluoroethylene present in the catalyst assembly 26.

In this embodiment the catalyst assembly 26 includes at least one packing structure 30 interspersed with the said at least one high surface area, inert, porous support 28, and at least one packing structure 30 having an exterior which is substantially hydrophilic and relatively non catalytically active with regard to gaseous hydrogen and oxygen combining, and said at least one packing structure 30 comprises 25 to 75% of the surface area of the catalyst assembly 26.

The cooling water inlet means 8 comprises a pipe 32 having a coiled end 34 in the shape of a plane spiral and nozzles 36 for distributing sprayed water over the catalyst assembly 26.

The gaseous oxygen inlet means 10 comprises a pipe 38 having a coiled end 40 in the shape of a plane spiral and nozzles 42 for distributing gaseous oxygen over the catalyst assembly 26. The nozzles 42 are beneath the nozzles 36 so that the sprayed water assists in dispersing the gaseous oxygen over the catalyst assembly 26.

The hydrogen gas inlet means 12 comprises a pipe 44 having one or more branches in this instance branches 46 to 48, fitted with valves 50 to 52 respectively, with coiled ends 54 to 56 respectively. The coiled ends 54 to 56 are in the shape of flat spirals and are provided with nozzles 58 to 60 respectively. Tests have shown that, particularly above a flow rate of hydrogen of about 0.7 meters per second better mixing characteristics of the gaseous oxygen and hydrogen and a better temperature distribution in the catalyst assembly 26 are achieved because combination of gaseous oxygen and hydrogen occurs fairly evenly throughout the catalyst assembly 26.

The gas vent 14 contains a throttling valve valve 62.

The water cooling means 20 comprises a conventional water cooled heat exchanger and is connected by a pipe 64 to the inlet of the water circulating means 22, which may be a conventional centrifugal pump.

The outlet of the water circulating means 22 is connected by a pipe 66 to the cooling water inlet means 8. The pipe 66 has a branch 68 fitted with a valve 70 forming the means 24 for removing a portion of the water from circulation.

The high surface area supports 28 are preferably of alumina and good results have been obtained with gamma alumina.

The packing structures 30 may be of a ceramic and are preferably the same size and shape as the high surface area supports 28.

In operation gaseous hydrogen, for example enriched with deuterium, is distributed by the hydrogen gas inlet means 12 in the catalyst assembly 26 while cooling water and gaseous oxygen are fed thereto by the cooling water inlet means 8 and gaseous oxygen inlet means 10 respectively.

The gaseous oxygen and hydrogen are combined in the catalyst assembly 26 into water vapour with the platinum therein catalyzing the process and the cooling water condensing the water vapour by substantially maintaining the catalyst assembly below 100° C.

The condensed water thus produced, together with the cooling water, collects in the liquid water collecting section 6 as liquid water 72, from where it is drawn through the water cooling means 20 by the water circulating means 22 for recirculation.

When the circulating water attains a desired volume a portion of it, equal to the oxygen and hydrogen being combined is then either continuously or intermittently removed by means 24.

In a test apparatus the casing 1 had a 5 cm internal diameter and the intermediate section was packed with 50% catalyst supports 28 and 50% packing structure 30. The catalyst supports were ⅛ inch (3.18 mm) diameter pellets of gamma alumina with 0.2 weight % platinum of the total weight of support, platinum and polytetrafluoroethylene present in the catalyst assembly 26. The packing structure 30 was ¼ inch (6.35 mm) diameter ceramic spheres.

The apparatus was operated with hydrogen gas flow rates to the hydrogen gas inlet means 12 of up to 5 liters per minute for 40 days. The oxygen flow rate to the gaseous oxygen inlet means 10 was set at 2% in excess of the stoichiometric requirement for thermodynamic considerations.

The flow rate of cooling water to the cooling water inlet means 10 was adjusted so that the highest temperature in the catalyst assembly 26 did not exceed 80° C. A typical example is if the hydrogen gas flow rate to the hydrogen gas inlet means 12 is 3.8 L/min., the cooling water flow rate to the cooling water inlet means 10 is 320 mL/min., at a temperature of 30° C., and the temperature of the liquid water 72 is 65° C.

Analysis by mass spectrometry indicated that more than 99.9+% of the hydrogen gas was combined with the gaseous oxygen.

A total of sixteen gas samples were taken from the liquid water collecting section 6, above the water level 16.

Initial samples highlighted two problems: leaky sample flasks and insufficient oxygen for complete recombination. The first problem was solved by the use of high quality metal bellows valves and the second by incorporating a soapbubble flow meter to ensure an excess of oxygen at all times. A positive displacement sampling technique with flow-through flasks was also used.

Five good samples were taken with excess oxygen in the range 2.8-5.4 volume %. The mass spectrometer analyses are shown in the following Table I. These results indicate that the positive displacement method of sampling is the best procedure to exclude air contamination. The 3.18% $N_2$ in sample 5 can be accounted for by a concentration of <0.1% $N_2$ in the oxygen fed to the gaseous oxygen inlet means 10.

The efficiency of the apparatus shown in the drawing, from the analysis for sample 5, has been calculated as 99.9988%. The corresponding flow conditions were 1.9 l/min of hydrogen at both of the branches 46 and 47 for a total of 3.8 L/min with 1.95 L/min of oxygen to the inlet means 10. The excess oxygen was more accurately measured by the soapbubble meter to be 55 cm$^3$/min.

In order to confirm that formation of the oxides of nitrogen at low temperatures was not occurring two condensate water samples from the liquid water 72 were analyzed for nitrogen oxides and pH. The nitrogen oxide concentration was <10$^{-6}$ mol/L, the limit of detection, and pH values of 7.3 and 6.4 were obtained. The difference in the two pH values is not significant and they are representative of pure water.

TABLE I

Composition of Effluent Gas From the Liquid Water Collecting Section 6

| Sample | Sample Technique | Composition (vol. %) | | | |
|---|---|---|---|---|---|
| | | Ar | $O_2$ | $N_2$ | $H_2$ |
| 1 | Evacuated Flask | 3.31 | 82.55 | 14.04 | 0.09 |
| 2 | | 3.04 | 85.84 | 11.05 | 0.07 |
| 3 | | 2.10 | 81.25 | 16.60 | 0.05 |
| 4 | | 2.53 | 81.94 | 15.44 | 0.07 |
| 5 | Positive Displacement | 2.99 | 93.74 | 3.18 | 0.08 |

The tests showed that using the present invention:

(1) Very high conversion efficiencies e.g. 99.9988% have been obtained at flow rates and at temperatures not exceeding 60° C.

(2) No evidence was found for the formation of nitrogen oxides which would be the precursors of nitric acid for which tests were negative.

(3) The catalyst assembly could be cooled efficiently, easily, and directly with liquid water and was clearly superior to the conventional catalyst assemblies which must be operated with the water in the vapour phase.

(4) Preferably the platinum particles was about 0.2 weight % of the total weight of support, platinum and polytetrafluoroethylene present in the catalyst assembly.

(5) Preferably the polytetrafluoroethylene was about 2.5 to about 3.5 weight % of the total weight of support, platinum and polytetrafluoroethylene present in the catalyst assembly.

(6) For best results the polytetrafluoroethylene was about 3 weight % of the total weight of support, platinum and polytetrafluoroethylene present in the catalyst assembly.

The present invention may be used, for example, (a) in a tritium recovery plant where combination of hydrogen isotopes is a process requirement.

(b) in a nuclear reactor cover-gas and off-gas systems (c) when hydrogen is generated in a nuclear reactor under abnormal operating conditions, e.g. a temperature excursion in the reactor core (d) in the purification of hydrogen and oxygen gas streams from water electrolytic cells.

In some embodiments of the present invention where the depth of the packed bed disturbs distribution of the cooling water trickling through the packed bed, it is desirable to provide distributors to compensate for this disturbance in the packed bed.

We claim:

1. A method of combining gaseous hydrogen and oxygen comprising:

(a) distributing a flow of gaseous hydrogen in a catalytic assembly located in and substantially filling an intermediate portion of an upwardly extending casing, (b) distributing a flow of cooling water, from a cooling water inlet to the casing, downwardly into the catalytic assembly from an upper portion of the casing, (c) distributing gaseous oxygen in the upper portion of the casing, (d) circulating draining water from a lower portion of the casing to the cooling water inlet, and (e) removing a portion of the water from circulation, and wherein (f) the catalyst assembly comprises at least one high surface area, inert, porous support with platinum particles embedded in the pores, and beneath the exterior thereof, and a polytetrafluoroethylene coating thereon over the platinum particules comprising about 0.1 to about 0.5 weight % of the total weight of support, platinum and polytetrafluoroethylene present in the catalyst assembly, and the polytetrafluoroethylene comprising about 2 to about 4 weight % of the total weight of support, platinum and polytetrafluoroethylene present in the catalyst assembly, so that:

(g) the catalyst does not rapidly lose its activity by contact with the cooling water and has a good conversion efficiency.

2. A method according to claim 1, wherein the platinum particles comprise about 0.2 weight % of the total weight of support, platinum and polytetrafluoroethylene present in the catalyst assembly.

3. A method according to claim 1, wherein the polytetrafluoroethylene comprises about 2.5 to about 3.5 weight % of the total weight of support, platinum and polytetrafluoroethylene present in the catalyst assembly.

4. A method according to claim 1, wherein the polytetrafluoroethylene comprises about 3 weight % of the total weight of support, platinum and polytetrafluoroethylene present in the catalyst assembly.

* * * * *